(12) United States Patent
Bates et al.

(10) Patent No.: US 8,082,207 B2
(45) Date of Patent: Dec. 20, 2011

(54) SCORED NEGATIVE FILE SYSTEM AND METHOD

(75) Inventors: Michael R. Bates, Fountain Hills, AZ (US); Gregory A. Nelson, Carlsbad, CA (US)

(73) Assignee: Certegy Check Services, Inc., Jacksonville, FL (US)

( * ) Notice: Subject to any disclaimer, the term of this patent is extended or adjusted under 35 U.S.C. 154(b) by 1688 days.

(21) Appl. No.: 10/870,554

(22) Filed: Jun. 17, 2004

(65) Prior Publication Data

US 2005/0283429 A1 Dec. 22, 2005

(51) Int. Cl.
*G06Q 40/00* (2006.01)
(52) U.S. Cl. ............................. 705/38; 705/35
(58) Field of Classification Search ...................... 705/38
See application file for complete search history.

(56) References Cited

U.S. PATENT DOCUMENTS

| | | | |
|---|---|---|---|
| 4,187,498 A | 2/1980 | Creekmore |
| RE30,580 E | 4/1981 | Goldman et al. |
| 4,319,336 A | 3/1982 | Anderson et al. |
| 4,326,259 A | 4/1982 | Cooper et al. |
| 4,346,442 A | 8/1982 | Musmanno |
| 4,376,978 A | 3/1983 | Musmanno |
| 4,460,604 A | 7/1984 | Lednicer |
| 4,463,250 A | 7/1984 | McNeight et al. |
| 4,472,626 A | 9/1984 | Frid |
| 4,562,341 A | 12/1985 | Ohmae et al. |
| 4,597,046 A | 6/1986 | Musmanno et al. |
| 4,672,377 A | 6/1987 | Murphy et al. |
| 4,718,009 A | 1/1988 | Cuervo |
| 4,727,243 A | 2/1988 | Savar |
| 4,734,564 A | 3/1988 | Boston et al. |
| 4,736,294 A | 4/1988 | Gill et al. |
| 4,758,714 A | 7/1988 | Carlson et al. |
| 4,774,663 A | 9/1988 | Musmanno et al. |
| 4,774,664 A | 9/1988 | Campbell et al. |
| 4,804,825 A | 2/1989 | Bitoh |
| 4,810,866 A | 3/1989 | Lord, Jr. |
| 4,812,628 A | 3/1989 | Boston et al. |
| 4,851,994 A | 7/1989 | Toda et al. |
| 4,868,866 A | 9/1989 | Williams, Jr. |

(Continued)

FOREIGN PATENT DOCUMENTS

WO WO 94/06103 3/1994

OTHER PUBLICATIONS

A Data Mining Approach to Credit Risk Evaluation and Behaviour Scoring Sara C. Madeira, Arlindo L. Oliveira, and Catarina S. Conceicao 2003.*

(Continued)

*Primary Examiner* — Lindsay M Maguire
*Assistant Examiner* — James Vezeris
(74) *Attorney, Agent, or Firm* — Finnegan, Henderson, Farabow, Garrett & Dunner, LLP

(57) ABSTRACT

System and method for validating a payment. The method can include obtaining a first account identifier, accessing a database containing a plurality of risk scores, each one of the plurality of risk scores being associated with one of a plurality of account identifiers, obtaining a first risk score from the plurality of risk scores, the first risk score being associated with the first account identifier, and determining an acceptance decision by comparing the first risk score against a risk threshold value.

15 Claims, 6 Drawing Sheets

U.S. PATENT DOCUMENTS

| | | | |
|---|---|---|---|
| 4,870,259 A | 9/1989 | Boggan et al. | |
| 4,872,113 A | 10/1989 | Dinerstein | |
| 4,914,587 A | 4/1990 | Clouse | |
| 4,943,707 A | 7/1990 | Boggan | |
| 4,953,085 A | 8/1990 | Atkins | |
| 4,989,141 A | 1/1991 | Lyons et al. | |
| 5,023,782 A | 6/1991 | Lutz et al. | |
| 5,025,138 A | 6/1991 | Cuervo | |
| 5,053,607 A | 10/1991 | Carlson et al. | |
| 5,060,153 A | 10/1991 | Nakagawa | |
| 5,161,103 A | 11/1992 | Kosaka et al. | |
| 5,175,682 A | 12/1992 | Higashiyama et al. | |
| 5,177,342 A | 1/1993 | Adams | |
| 5,201,010 A | 4/1993 | Deaton et al. | |
| 5,210,687 A | 5/1993 | Wolfberg et al. | |
| 5,231,569 A | 7/1993 | Myatt et al. | |
| 5,231,570 A | 7/1993 | Lee | |
| 5,239,462 A | 8/1993 | Jones et al. | |
| 5,262,941 A | 11/1993 | Saladin et al. | |
| 5,274,547 A | 12/1993 | Zoffel et al. | |
| 5,276,608 A | 1/1994 | Nakagawa et al. | |
| 5,307,481 A | 4/1994 | Shimazaki et al. | |
| 5,323,315 A | 6/1994 | Highbloom | |
| 5,325,298 A | 6/1994 | Gallant | |
| 5,326,960 A | 7/1994 | Tannenbaum | |
| 5,350,906 A | 9/1994 | Brody et al. | |
| 5,361,201 A | 11/1994 | Jost et al. | |
| 5,384,449 A | 1/1995 | Peirce | |
| 5,386,104 A | 1/1995 | Sime | |
| 5,398,300 A | 3/1995 | Levey | |
| 5,444,819 A | 8/1995 | Negishi | |
| 5,479,573 A | 12/1995 | Keeler et al. | |
| 5,630,127 A | 5/1997 | Moore et al. | |
| 5,649,116 A | 7/1997 | McCoy et al. | |
| 5,679,938 A | 10/1997 | Templeton et al. | |
| 5,679,940 A * | 10/1997 | Templeton et al. | 235/380 |
| 5,717,923 A | 2/1998 | Dedrick | |
| 5,719,918 A | 2/1998 | Serbetciouglu et al. | |
| 5,732,400 A | 3/1998 | Mandler et al. | |
| 5,797,133 A | 8/1998 | Jones et al. | |
| 5,819,226 A | 10/1998 | Gopinathan et al. | |
| 5,862,223 A | 1/1999 | Walker et al. | |
| 6,018,723 A | 1/2000 | Siegel et al. | |
| 6,119,103 A | 9/2000 | Basch et al. | |
| 6,164,528 A | 12/2000 | Hills et al. | |
| 6,496,936 B1 * | 12/2002 | French et al. | 726/7 |
| 6,647,376 B1 | 11/2003 | Farrar et al. | |
| 6,658,393 B1 | 12/2003 | Basch et al. | |
| 6,783,065 B2 * | 8/2004 | Spitz et al. | 235/380 |
| 2002/0040344 A1 | 4/2002 | Preiser | |
| 2002/0073019 A1 | 6/2002 | Deaton | |
| 2002/0099649 A1 * | 7/2002 | Lee et al. | 705/38 |
| 2002/0116236 A1 | 8/2002 | Johnson et al. | |
| 2002/0138449 A1 | 9/2002 | Kendall et al. | |
| 2002/0178112 A1 | 11/2002 | Goeller et al. | |
| 2002/0194096 A1 * | 12/2002 | Falcone et al. | 705/35 |
| 2003/0130919 A1 * | 7/2003 | Templeton et al. | 705/35 |
| 2003/0217003 A1 * | 11/2003 | Weinflash et al. | 705/42 |
| 2003/0217014 A1 | 11/2003 | Mollett et al. | |
| 2003/0233325 A1 | 12/2003 | Belyi | |
| 2004/0089711 A1 | 5/2004 | Sandru | |
| 2004/0143552 A1 | 7/2004 | Weichert et al. | |
| 2005/0125338 A1 * | 6/2005 | Tidwell et al. | 705/39 |
| 2006/0136329 A1 * | 6/2006 | Ahles | 705/38 |

OTHER PUBLICATIONS

Consumer credit scoring: Do situational circumstances matter? Robert B. Avery, Paul S. Calem , Glenn B. Canner Board of Governors of the Federal Reserve System, Division of Research & Statistics, Stop 153, Washington, DC 20551, USA.*

* cited by examiner

SCORED NEGATIVE FILE SYSTEM AND METHOD

BACKGROUND OF THE INVENTION

The present invention relates to validating payments during transactions. In particular, embodiments of the invention relate to validating check payments presented during transactions.

A traditional negative file consists of account holders (i.e., individuals or organizations with checking accounts) that currently have outstanding returned checks at a retailer that is a member of the shared check authorization network ("SCAN"). Whenever an account holders presents a check to a retailer, the retailer determines whether the account holder has any unpaid returned checks by cross-referencing the negative file. Many of the account holders listed in the negative file, however, unintentionally write checks with insufficient funds in their checking accounts. Account holders may have incomplete or inaccurate knowledge concerning the balance in their account or may have forgotten to transfer or deposit money to cover recent checks. Many of the account holders listed in the negative file may pay off their returned checks quickly, and frequently will have money in their account to cover future issued checks. When this type of account holder gets turned down for a transaction because they appear in the negative file, the retailer loses a sale and potentially creates a customer service issue, when, in reality, the retailer may have declined a valid form of payment and may have lost a sale unnecessarily.

SUMMARY OF THE INVENTION

Some embodiments of the invention provide a system for assigning a risk score to a financial account. The system can include an account information application that stores characteristics regarding the financial account, and a scoring application configured to obtain the characteristics, determine a risk score for the financial account, and store the risk score and an identifier of the financial account in a storage location.

Additional embodiments of the invention provide a method of validating a payment. The method can include obtaining a first account identifier; accessing a database containing a plurality of risk scores, each one of the plurality of risk scores being associated with one of a plurality of account identifiers; obtaining a first risk score from the plurality of risk scores, the first risk score being associated with the first account identifier; and determining an acceptance decision by comparing the first risk score against a risk threshold value.

DETAILED DESCRIPTION

Figure 1:
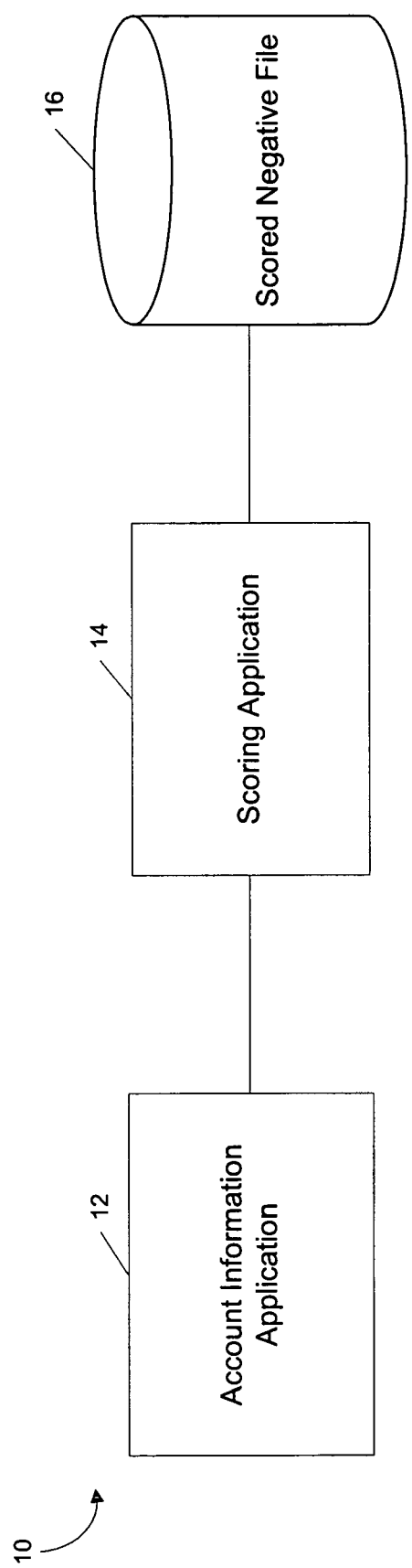
FIG. 1 illustrates a system for determining a risk score for a financial account according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible.

FIG. 1 illustrates a scoring system 10 according to one embodiment of the invention. The scoring system 10 can be configured to assign a risk score to a financial account of an account holder. The scoring system 10 can include an account information application 12, a scoring application 14, and a scored negative file 16. The account information application can be an application configured to provide information regarding a financial account. The account information application 12 can be executed by a computer, database, server, etc., and can be operated or managed by a bank, credit union, or other institution capable of issuing and maintaining financial accounts. A retail computer, such as a cash register or point-of-sale ("POS") terminal, can also execute the account information application 12.

The account information application 12 can generate messages when activity occurs on a financial account. For example, the account information application 12 can transmit characteristics of the financial account to the scoring application 14 when a new account is opened at the financial institution, when a deposit or withdrawal is made on the financial account, when a check for the financial account successfully clears, when a check for the financial account gets returned for insufficient funds, etc. The account information application 12 can transmit characteristics to the scoring application 14 over a direct link or indirectly through any suitable network, such as a local area network ("LAN") or the Internet. The characteristics can also be manually delivered to the scoring application 14.

Although FIG. 1 illustrates a direct connection between the account information application 12 and the scoring application 14, other intermediary devices and applications can be positioned between the account information application 12 and the scoring application 14, such as various routers, gateways, and other transmitting and processing applications. The intermediary applications can perform simple forwarding or routing functionality or can process the transmitted data. An adapter application, for example, can obtain data from the account information application 12 and can convert or translate the obtained data into a format or structure that is understood by the scoring application 14. Data transmitted by the account information application 12 can include confidential information, such as financial account numbers, social security numbers, account holder names, etc. As a result, the account information application 12, or an intermediary processing application, can encrypt the transmitted data to keep confidential and sensitive data secure.

The scoring application 14 can be executed by a retail or financial institution computer, server, database, etc., and can be configured to obtain data from the account information application 12. Although only one account information application 12 is illustrated in FIG. 1, the scoring application 14 can be configured to obtain data from a number of account information applications 12 or other applications capable of transmitting account data. The scoring application 14 can be part of the shared check authorization network ("SCAN") and can serve as a central processing location for a number of financial institutions.

The scoring application 14 can be configured to assign a risk score to a financial account. After the scoring application 14 determines a risk score, the scoring application 14 can be configured to transmit the risk score to the scored negative file 16. The scoring application 14 can transmit a financial account identifier associated with each risk score. The financial account identifier can be a checking account number, a check card number, a driver's license number, a personally-chosen identifier, etc. The scored negative file 16 can also include other information, such as the number of checks returned for insufficient funds, the date of last deposit, the date of the last returned check, the amount of the last deposit, the number of checks awaiting processing, etc. The scoring application 14 can be configured to transmit all of the data received regarding a financial account to the scored negative file 16. However, in some embodiments, the scored negative file 16 can include only the risk score and an account identifier for each financial account. The data used to arrive at the risk score, such as the data received from the account information application 12, can be stored in a separate archive or storage location (not shown).

The scored negative file 16 can be stored in a database or other data storage device. The scored negative file 16 can also be printed by an image processing apparatus, such as a printer, and physically stored or filed by the retailer. As noted, a number of intermediary devices and/or applications can be positioned between the scoring application 14 and the scoring negative file 16. For example, the scoring application 14 can transmit account data and the associated risk score to a data manager application (not shown) that adds the data to a database or writes a modified file to a disk. A data manager application can also be used to authenticate submitting devices, such as the scoring application 14, before data is added to or modified in the database or the file.

In some embodiments, the scoring application 14 or other intermediary application can encrypt the data before storing the scored negative file 16 in a database or a file. Encrypting the data can allow only authenticated applications to access or view data contained within the scored negative file 16.

Figure 2:
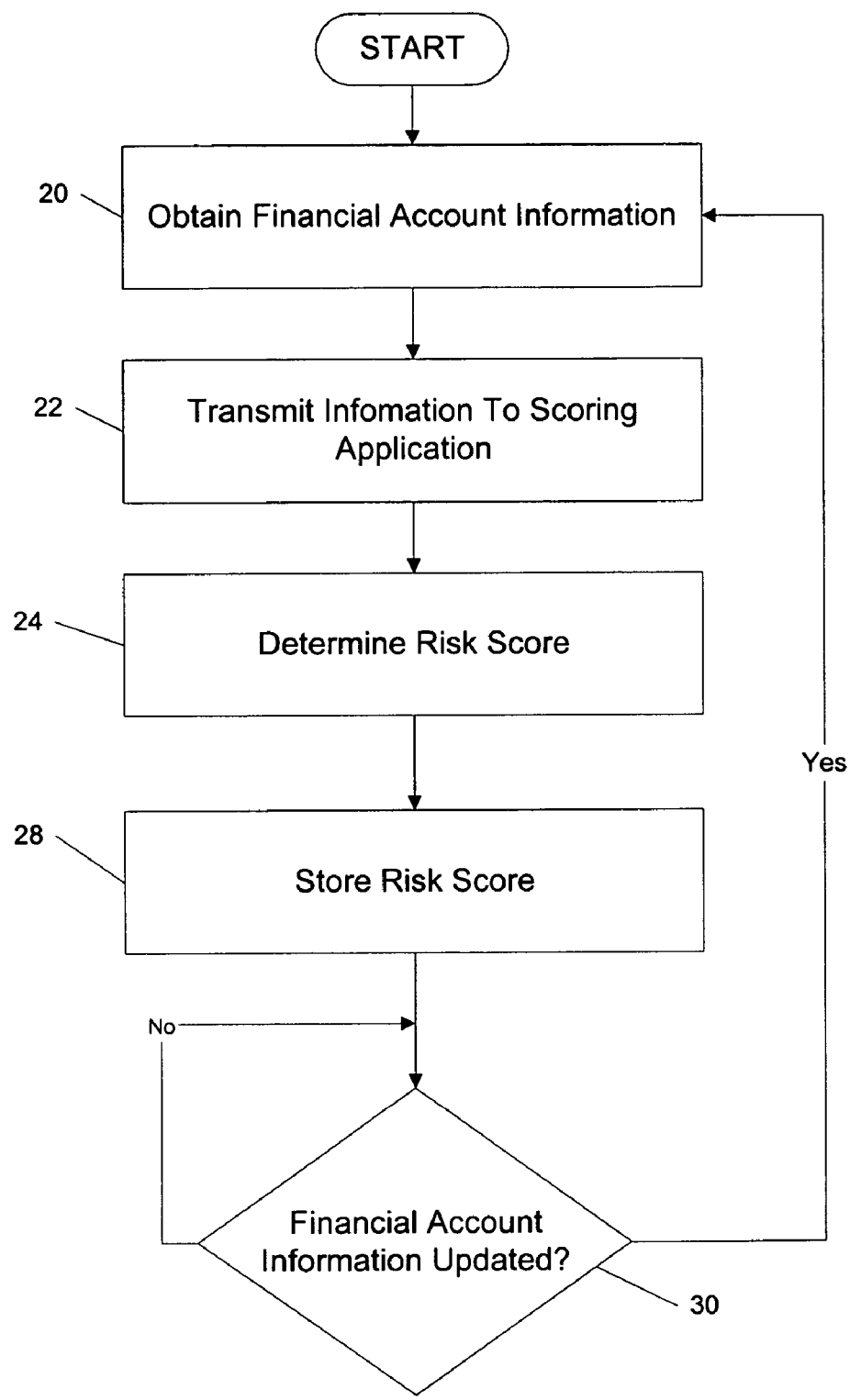
FIG. 2 is a flow chart illustrating a process of determining a risk score for a financial account according to one embodiment of the invention.

FIG. 2 illustrates a process of assigning a risk score to a financial account according to one embodiment of the invention. The process can be executed by the scoring system 10 as described in FIG. 1, although other system configurations are possible. The account information application 12 can obtain (at 20) information regarding a financial account. The account information application 12 can access other applications or systems in order to obtain the financial account information. For example, the account information application 12 can access banking systems or archives to obtain information regarding a particular financial account. Other devices and applications can be configured to transmit financial account information to the account information application 12. The financial account information can be internally held by the account information application 12. The account information application 12 can be configured to obtain or calculate supplemental data based on the information obtained or maintained for a financial account.

After the account information application 12 has obtained the financial account information, the account information application 12 can transmit (at 22) the information to the scoring application 14. However, the scoring application 14 can alternatively directly obtain the financial account information by accessing a data storage location of the account information application 12. The scoring application 14 can also be configured to receive information from a number of account information applications 12 and combine all the information related to a particular financial account. The scoring application 14 can be configured to process the received information. The scoring application 14 can process the received information by structuring the data into a particular format or by validating the received data and issuing errors or messages if the received information is incomplete or inaccurate.

After the scoring application 14 has obtained the financial account information, the scoring application 14 can determine (at 24) a risk score for the financial account. Various decision and predictive applications can be used to determine the risk score. In some embodiments, the scoring application 14 can use a decision tree to determine the risk score for a financial account.

The scoring application 14 can store (at 28) the risk score along with an account identifier in the scored negative file 16. The scoring application 14 can store all of the risk scores and associated account identifiers in the scored negative file 16 or can only store a subset of risk scores and account identifiers. For example, in some embodiments, the scoring application 14 can only store risk scores for those accounts assigned a risk score over a certain value. In some embodiments, the scoring application 14 only receives account data for delinquent accounts from the account information application 12, in which case only those financial accounts with a delinquent risk score are stored in the scored negative file 16. The delinquent risk score can be a high value or a low value, depending on the particular calculations made and the particular threshold values.

The risk scores for the financial accounts can be updated when necessary so that the scored negative file 16 accurately indicates the current risk of a check being returned from the financial account. After an initial risk score has been stored in the scored negative file 16, the account information application 12 can determine (at 30) whether any information or characteristic associated with the particular financial account has been updated or modified. When the information or characteristics of a financial account are updated or modified, a new risk score can be calculated and stored so that the current risk associated with the financial account is accurately indicated in the scored negative file 16. For example, a deposit into a financial account may result in a new risk score indicating less risk associated with the financial account. The new risk score can allow the account holder to use a check as a form of payment, even if the old score would have caused a retailer to reject a check from the account holder. It is in the best interest of both retailers and account holders to have risk scores recalculated when a financial account experiences activity.

If an event has occurred warranting the recalculation of the risk score, the account information application 12 can obtain (at 20) updated or modified financial account information for the financial account. The account information application 12 can transmit (at 22) the updated or modified account information to the scoring application 14, and the scoring application 14 can determine (at 24) and store (at 28) a new risk value. New risk scores may overwrite existing risk scores or may be stored as a history of risk scores (e.g., kept over time and associated with particular dates).

Events warranting the recalculation of the risk scores include, but are not limited to, the return of an unfinanced check for the financial account, the clearing of a financed check for the financial account, the observing of no or little activity on the financial account over a certain number of days, or the elapsing of a certain number of days without payment on a returned check. In the absence of account activity or events, the account information application 12 can continue to wait for information to be added or modified.

In some embodiments, the scoring application 14 can be configured to query the account information application 12 for updated account information. For example, the scoring application 14 can be configured to periodically cycle through a list of known financial accounts and request a status check from the account information application 12. In one embodiment, the scoring application 14 can request account information each day from the account information application 12 for all accounts listed in the scored negative file 16. Similarly, the account information application 12 can be configured to periodically send account information to the scoring application 14, regardless of whether the account information has been modified since the previous time the scoring application 14 received the account information. In other embodiments, the addition or modification of account information can trigger the transmitting of the new account information to the scoring application 14 without the account information application 12 or scoring application 14 querying or waiting for updates or requests.

Figure 3:
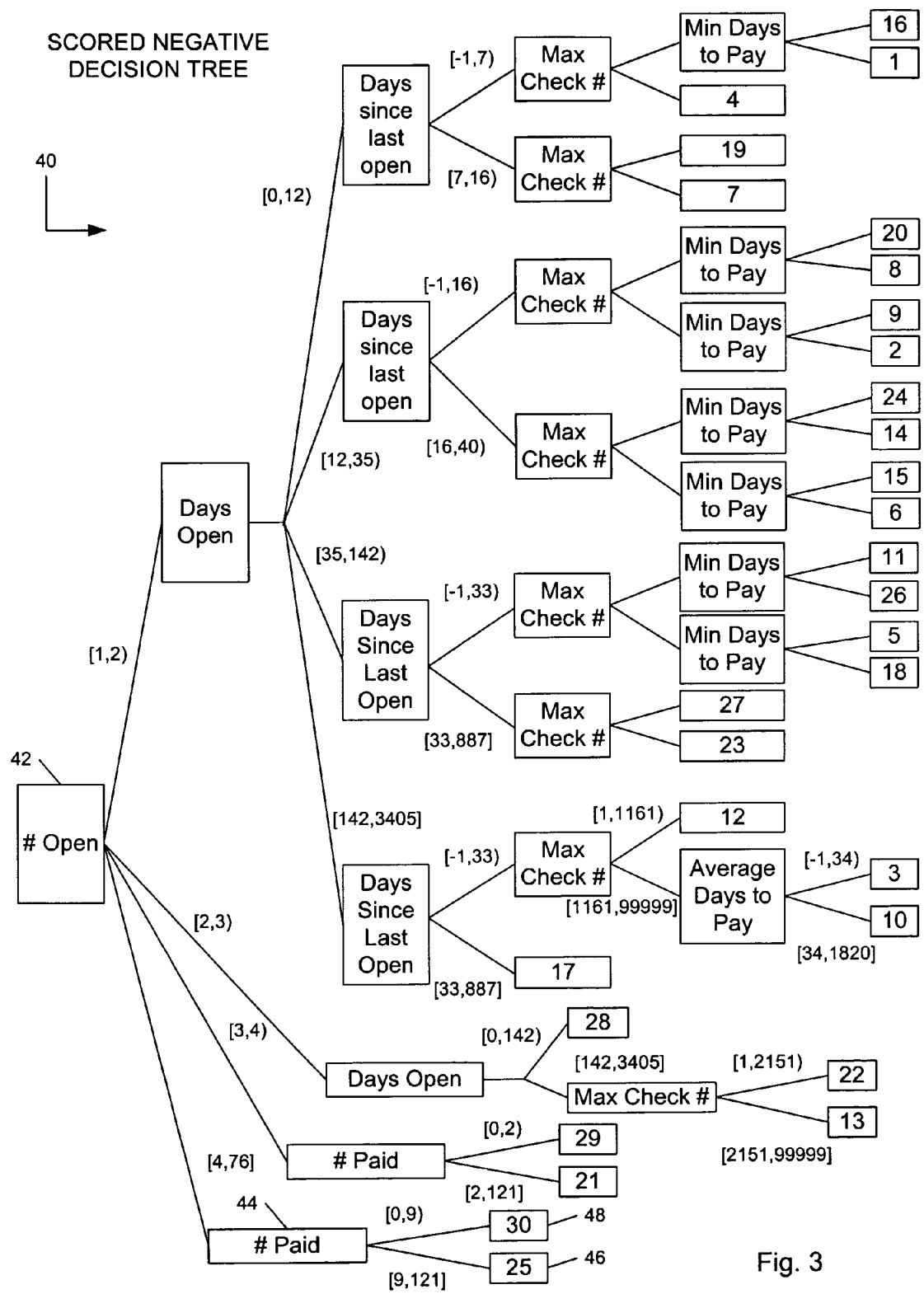
FIG. 3 is a decision tree for applying a risk score to a financial account according to one embodiment of the invention.

FIG. 3 illustrates a decision tree 40 for use with the scoring system 10 in some embodiments of the invention. The scoring application 14 can use the decision tree 40 to determine a risk score for a financial account. The decision tree 40 can use as an input an object described by a set of attributes or characteristics and can return a predicated output value for the input. The decision tree 40 reaches an output by performing a sequence of tests at a series of internal nodes. Each internal node in the decision tree 40 corresponds to a test of the value of one or more of the attributes or characteristics. The decision tree 40 illustrated in FIG. 3 includes a number of internal nodes that test various financial account characteristics, such as the number of open or unpaid payments ("# Open"), the number of paid or financed payments ("# Paid"), the maximum number of days a payment has been unpaid ("Days Open"), the number of days the most recent unpaid payment has remained unpaid ("Days Since Last Open"), the highest number or identifier for an issued payment ("Max Check #), etc.

Figure 4:
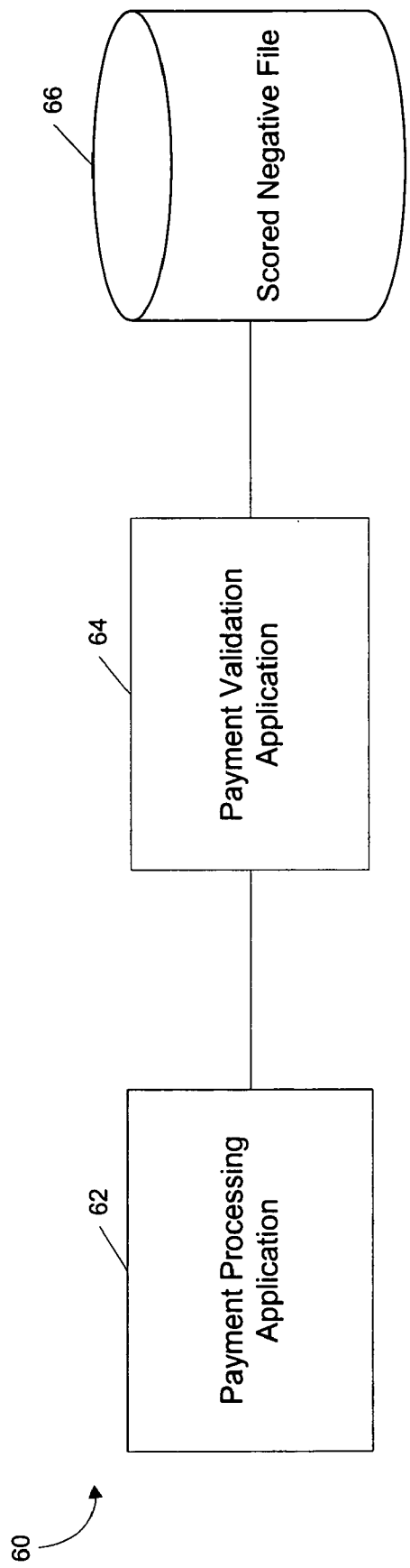
FIG. 4 is a system for validating a payment by evaluating the risk score associated with the payment according to one embodiment of the invention.

The branches from the nodes correspond to the possible results of the test. Each branch may indicate a single test result or may specify a range of possible results. The branches illustrated in FIG. 4 are labeled with a range of possible values. Some of the branch labels have been omitted to aid the clarity and readability of the figure. The branches lead to other internal nodes or to leaf nodes. Each leaf node in the decision tree 40 marks a final decision and specifies the value to be returned, or the output, if that leaf node is reached.

When used by the scoring application 14, the input to the decision tree 40 can include attributes or characteristics of a financial account. The attributes or characteristics can include the number of paid or cleared checks, the number of returned or unfinanced checks, the days the first returned check has remained unfinanced, the date of the last cleared check, the average number of days returned checks remain unfinanced, the date and time when the last risk score was calculated, etc. The scoring application 14 can obtain the attribute or characteristics from the account information application 12, can calculate any corresponding data internally, or can internally store the information. For example, the scoring application 14 can receive the dates of all paid and returned checks and can calculate the average number of days that returned checks remain unfinanced. In other embodiments, the scoring application 14 can receive all the data required directly from the account information application 12 or another input device or application, without having to perform any calculations. In some embodiments, the scoring application 14 can internally store and access a portion of the attribute or characteristic information, such as the date of the last the risk score calculation. This information can be stored in the scored negative file 16 or another associated archive.

The decision tree 40 shown in FIG. 3 includes a root node 42 that represents the starting location of the decision tree 40. Upon receiving account information for a financial account, the scoring application 14 can input the account information into the decision tree 40 starting at the root node 42. At the root node 42, the decision tree 40 can examine the number of open or returned checks for the financial account. Four branches leading to other nodes extend from the root node 42, creating four possible results or outcomes for the test presented at the root node 42. Each branch is marked with an option for the open or returned check count. For example, the top branch leading from the root node 42 is followed if the financial account has 1 to 2 returned checks, the second branch is followed if the account has 2 to 3 returned checks, the third branch is followed if the account has 3 to 4 returned checks, and the fourth or bottom branch is followed if the account has 4 to 76 returned checks. The ranges assigned to any of the branches and/or nodes described herein are provided as example ranges only. Various other ranges than those shown and described can be assigned.

If, for example, a financial account has 5 open or returned checks, the bottom branch can be followed from the root node 42 to node 44. At node 44, the number of paid or cleared checks associated with the financial account is determined. Node 44 has two branches leading from it. The top branch is followed for accounts having 0 to 9 paid checks, while the bottom branch is followed for accounts having 9 to 121 paid checks. If the financial account has 10 paid checks (or another number within the range from 9 to 121), the bottom branch is followed to a leaf node 46. The leaf node 46 represents a final decision of the decision tree 40, because no additional paths are available. The leaf node boxes shown in FIG. 3 include numbers, with each number representing a risk score. In some embodiments, other markers or identifiers can be used to specify a risk score. For example, financial account risk scores can be a numerical value, a character string, a binary string, a graphical pattern, or any combination thereof.

In one embodiment, the decision tree 40 has thirty leaf nodes representing thirty possible risk scores. Leaf node 46 is marked with the number 25 indicating that the financial account whose attributes lead to leaf node 46 in the decision tree 40 has been assigned a risk score of 25. In the example presented above, a financial account with 5 open or returned checks and 10 paid or cleared checks would be assigned a risk score of 25. If, however, the financial account had 5 open or returned checks and had 7 paid checks, the top branch would be followed to a leaf node 48 where the financial account would be assigned a risk score of 30.

In some embodiments, the higher the risk score, the higher the risk that an account holder will write an unfinanced bad check. From the above example, a risk score of 30 can be associated with more risk score than 25, because accounts with the same number of returned checks, but fewer paid checks, can pose a higher risk of repeated unfinanced check writing. Alternatively, a risk score scale can be generated in such a way that the lower the risk score, the higher the risk that an account holder will write an unfinanced check.

The effectiveness of the decision tree 40 can be evaluated and modified in some embodiments of the invention. The risk scores assigned by the decision tree 40 can be reviewed to ensure that accurate scores are being determined for financial accounts and that a financial account is not receiving too high of a risk score or too low of a risk score. An unnecessarily high risk score can prohibit an account holder from presenting a payment for a transaction, and an inaccurately low risk score can allow an unfinanced payment for a transaction to be accepted by a retailer. The decision tree 40 can be modified by changing the ranges specified on the branches and the score values placed at the leaf node. New tests can also be added to the decision tree 40 such as the difference between the first check number and the most recent check number, the date of the last deposit, etc.

FIG. 4 illustrates a validating system 60 according to one embodiment of the invention. The validating system 60 can be configured to validate or authorize an account holder presenting a check for payment. The validating system 60 can include a payment processing application 62, a payment validation application 64, and a scored negative file 66. A POS terminal or a cash register can execute the payment processing application 62. In other embodiments, another suitable hardware or software apparatus can be configured to obtain financial account data during a transaction. The payment processing application 62 can also be executed by a retail clerk or cashier.

Data obtained by the payment processing application 62 can be sent to the payment validation application 64. The payment processing application 62 and payment validation application 64 can communicate over direct links or over a network such as the Internet. Multiple intermediary devices can also be connected between the payment processing application 62 and the payment validation application 64.

In some embodiments, a POS terminal, cash register, or other suitable device, can execute the payment validation application 64. The payment validation application 64 can be executed on the same device or apparatus as the payment processing application 62. In some embodiments, the functionality of the payment processing application 62 and the payment validation application 64 can be combined and executed as a single application. In some embodiments, the payment validation application 64 can be executed by a central payment validating computer, server, database, etc. The payment validation application 64 can be configured to determine an acceptance decision for payments presented by an account holder. The acceptance decision can specify whether the payment should be accepted or declined. The acceptance decision can be based on whether the financial account associated with the payment matches a financial account (or a financial account identifier) listed in the scored negative file 66. In some embodiments, the acceptance decision can be based on a risk score associated with the financial account and a risk threshold value, in addition to the fact that the financial account is listed in the scored negative file 66.

In some embodiments, each retailer can individually set a risk threshold value to establish an acceptable risk limit for payment processing. The risk threshold value can provide a limit on risk scores that will be accepted by a retailer or a transaction provider. Financial accounts listed in the scored negative file 66 can still be accepted by a retailer, if the financial account has a risk score within a predetermined amount of the risk threshold value. The predetermined amount can accommodate situations in which the risk score is equal to the risk threshold value or less than or greater than the risk threshold value by a particular amount. The predetermined amounts can specify that payments from accounts with risk scores less than the risk threshold value will be accepted, that payments from accounts with risk scores equal to the risk threshold value will be accepted, that payments from accounts with risk scores greater than the risk threshold value will be accepted, that payments from accounts with risk scores within a certain number of points of the risk threshold value will be accepted, or any combination thereof.

In some embodiments of the invention, each retailer can set an individual risk threshold value to establish a suitable balance between rejecting all payments and accepting all payments. Accepting all payments can lead to lost sales through returned checks, but can increase total sales by accepting checks that are ultimately financed from the financial accounts listed in the scored negative file 16. Alternatively, rejecting all payments linked to financial accounts listed in the scored negative file 16 can result in lost sales if an account holder does not have alternate payment methods, but can increase total sales by decreasing the amount of lost revenue due to returned checks. A retailer who cannot afford a large number of returned checks or who is currently experiencing a large number of returned checks and losing revenue, can set a high risk threshold value (e.g., only those financial accounts with a low risk will be accepted). Alternatively, a retailer can set a low risk threshold value (e.g., those financial accounts with low and high risks will be accepted) hoping that the increase in total sales by accepting more payments will be greater than the amount of sales lost by accepting checks that are later returned.

In some embodiments, the risk threshold value can be a dynamic value that is easily changed by each retailer or that changes automatically based on information regarding sales and/or previous returned checks. In other embodiments, the risk threshold value can be set by the retailer associated with the payment processing application 62, can be a standard value accepted by all retailers, or can be a specific risk threshold value for a particular market. For example, a grocery store may be able to set its own risk threshold value, may be required to adopt a risk threshold value used by all retailers, or may be required to adopt a risk threshold value used by all grocery-related retailers.

In some embodiments, a payment validation application 64 can be individually configured for a particular retailer. Multiple retailers can also share one payment validation application 64. For example, the payment validation application 64 can be managed by SCAN and can be used by a number of payment processing applications 62. In other embodiments, retailers can have individually-configured payment validation applications that transmit payment validation requests to a global or central payment validation application configured to provide payment validation information to a number of retailers.

In some embodiments, the payment validation application 64 uses the scored negative file 66 to determine an acceptance decision. The scored negative file 66 illustrated in FIG. 4 can be the same scored negative file 16 illustrated in FIG. 2 or can be an individually-tailored scored negative file 66 for the payment validation application 64. In other embodiments, the scored negative file 66 can be a subset of the scored negative file 16 based on a particular risk threshold value. For example, the scored negative file 66 can include a subset of financial accounts listed in the scored negative file 16 whose risk scores are above, below, or equal to the particular risk threshold value. The scored negative file 66 can further be specialized to include only financial accounts having other particular attributes or characteristics, such as only those financial accounts having returned checks within a particular market. In some embodiments, the payment validation application 64 can receive the scored negative file 66 from a second payment validation application (not shown) configured to receive risk threshold values, configured to access the stored scored negative file 16, and configured to generate a list of financial accounts appearing in the scored negative file 16 that are above, below, or at a particular risk threshold value. The payment validation application 64 can also access the scored negative file 16 directly to generate the individually-tailored scored negative file 66.

The scored negative file 66 can be stored locally in a data storage location managed by the payment validating application 64 or can be stored in a centrally-located storage location such as a database, server, etc.

Rather than using the scored negative file 66 with the subset of financial accounts, the payment validation application 64 can be configured to use the entire scored negative file 16. The payment validation application 64 can first determine whether the financial account in question is listed in the scored negative file 16, and then can determine whether the financial account has a risk score that varies from the risk threshold value.

After determining whether a payment is associated with a financial account listed in the scored negative file 66, the payment validation application 64 can be further configured to report back to the payment processing application 62 in order to indicate whether the payment is accepted or declined.

Figure 5:
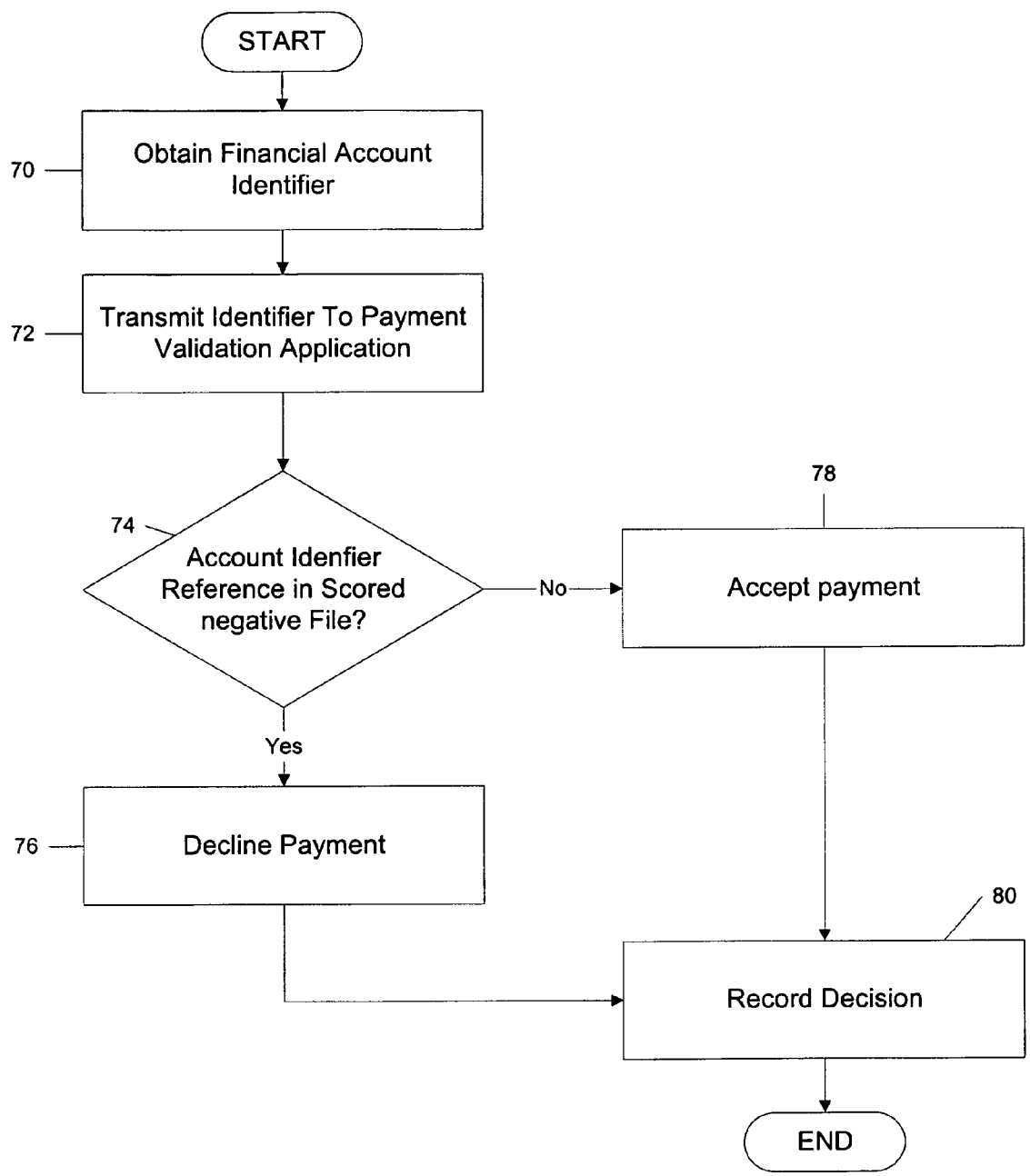
FIG. 5 is a flow chart illustrating a process of validating a payment by evaluating the risk score associated with the payment according to one embodiment of the invention.

FIG. 5 is a flow chart illustrating a process of validating a payment presented by an account holder for a transaction according to one embodiment of the invention. In some embodiments, the components of the validating system 60, as illustrated in FIG. 4, are configured to execute the steps of the process illustrated in FIG. 5. The payment processing application 62 can obtain (at 70) a financial account identifier from an account holder. The payment processing application 62 can obtain the financial account identifier by obtaining information from a form of payment or a form of identification presented to the payment processing application 62, such as a check card, a driver's license, a paper check, etc. The payment processing application 62 can obtain the information by scanning or reading the presented form of payment or identification. Alternatively, a retail clerk or cashier can request or read the information and can enter the information into the payment processing application 62. Otherwise, the account holder presenting the payment can enter the information into the payment processing application 62 him or herself.

After obtaining the financial account identifier, the payment processing application 62 can transmit (at 72) the financial account identifier to the payment validation application 64. The payment validation application 64 can use the account identifier to search the scored negative file 66 to determine (at 74) whether the financial account associated with the payment currently being processed is listed in the scored negative file 66. In some situations, the account identifier provided by the payment processing application 62 may identify more than one financial account. For example, a driver's license number can identify a number of financial accounts associated with a single individual or organization. The payment validation application 64 can search the scored negative file 66 for any financial account linked to the account identifier, regardless of the particular financial account the current payment is originating from. An individual or organization having a high risk score on one financial account can be at a higher risk for returned checks on any account he or she owns, and thus, all payments from this individual or organization can be declined.

Alternatively, the payment validation application 64 can transmit the account identifier to a second payment validation application (not shown). The second payment validation application can return a risk score from the scored negative file 16. The second payment validation application can allow the first payment validation application 64 to determine whether the risk score is above or below the risk threshold value. In some embodiments, the second payment validation application can make the acceptance decision for the payment validation application 64. For example, the second payment validation application can instruct the first payment validation application 64 to either accept or deny the payment by returning an acceptance decision. The second payment validation application can determine the acceptance decision by comparing the risk score for the financial account to the risk threshold value.

If the account identifier is associated with more than one financial account, the secondary payment validation application can return more than one risk score or can return only one of the multiple risk scores. For example, the secondary payment validation application can determine an acceptance decision based on the highest risk score or can return the highest risk score to the payment validation application 64.

If the account identified by the account identifier is listed in the scored negative file 66 or if the risk score is greater than the risk threshold value, the payment validation application 64 can decline (at 76) the payment. Alternatively, if the financial account is not listed in the scored negative file 66 or if the risk score is less than the risk threshold value, the payment validation application 64 can accept (at 78) the payment. Regardless of whether the payment validation application 64 accepts or declines the payment, the payment validation application 64 can be configured to record (at 80) the decision. Recording the decision can include storing information regarding the type of payment that was presented, the transaction the payment was V presented for, and/or whether the payment was accepted or declined. Recorded data can be stored locally by the payment validation application 64, by the payment processing application 62, or by other applications managed by the retailer. Otherwise, recorded data can be tracked and stored at a data storage location located external to the various applications managed by the retailer. A payment authorization application can be configured to track decisions for a number of retailers. Recording the payments accepted and the payments declined, along with their associated transactions, allows retailers to track their individual risk threshold value, and allows retailers to adjust their individual risk threshold value, as will be described below.

Figure 6:
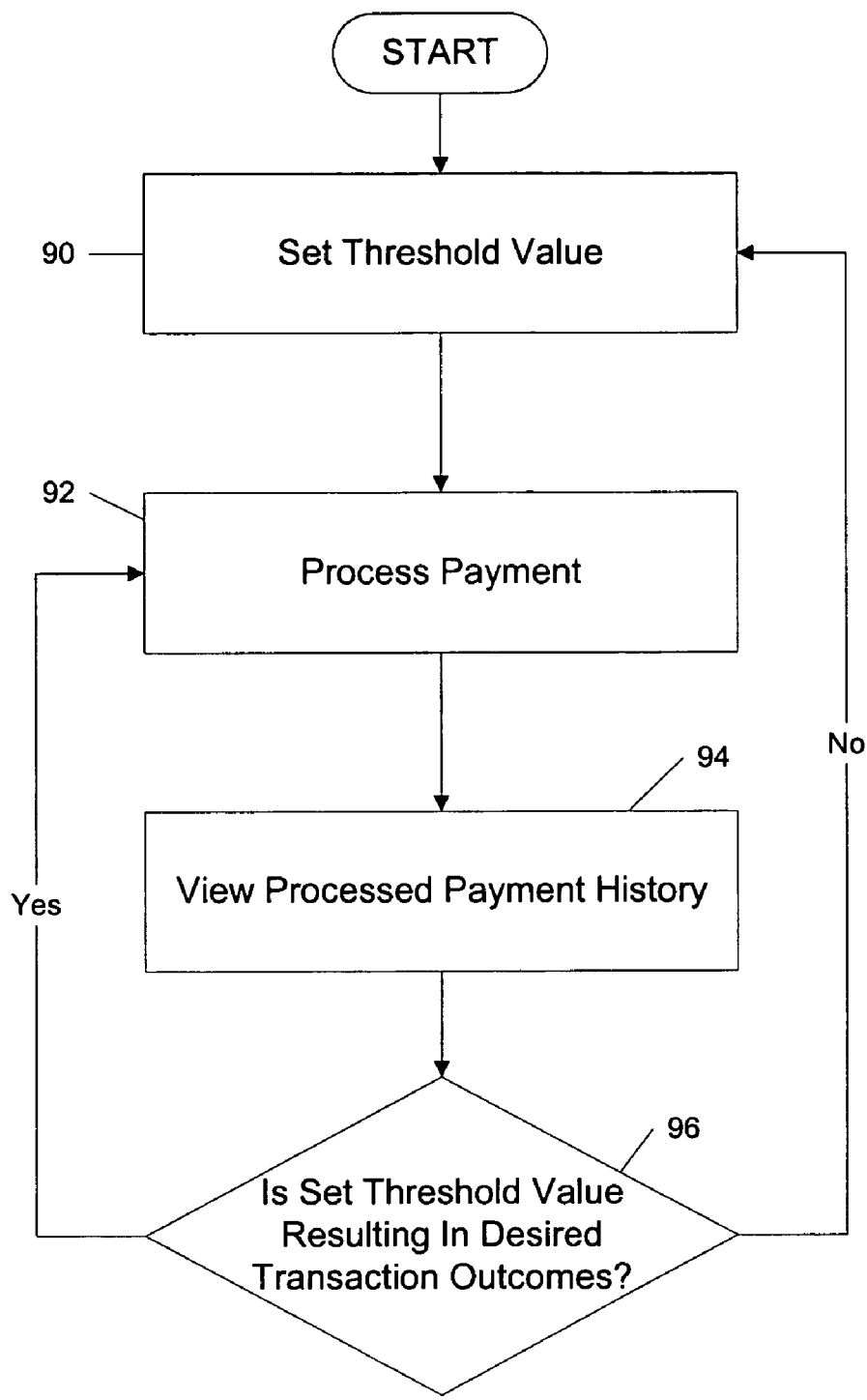
FIG. 6 is a flow chart illustrating a process of adjusting a risk threshold value according to one embodiment of the invention.

FIG. 6 is a flow chart illustrating a process of adjusting a risk threshold value according to one embodiment of the invention. After a retailer individually sets a risk threshold value, the retailer can track payment acceptance decisions and can adjust the risk threshold value based on previous decisions and their outcomes. Referring to FIG. 6, a retailer can set (at 90) a risk threshold value. A retailer can set the risk threshold value by inputting the selected value into a computer or other application such as the payment validation application 64. A retailer can also set a risk threshold value by manually informing a central payment authorization application or organization of a desired risk threshold value. For example, a retailer can call a payment authorization application or organization and voice the desired risk threshold value. The payment authorization application can record the risk threshold value and can generate the scored negative file 66 for the payment validation application 64 of the retailer based on the retailer's individual risk threshold value.

Once the risk threshold value has been set, the retailer can process (at 92) payments as shown and described with respect to FIG. 5. With each payment processed, a record can be recorded to an internal or remote data storage location as previously described with respect to FIG. 5. The record can include the financial account identifier, the payment issued, the characteristics of the transaction, the acceptance decision, etc.

The retailer, in some embodiments, can view (at 94) historical data for processed payments. The retailer can internally store the information or can request the historical data from a remote storage location. The payment validation application 64 can be configured to obtain and process the historical data, although the retailer can use other applications to track payment processing.

The historical data can be presented to the retailer in a number of forms, such as, graphical or chart form, summary form, raw data from, etc. The historical data can indicate sales lost due to declined payments, revenue lost due to the acceptance of unfinanced payments, etc. The retailer can use the historical data to determine whether the risk threshold value is creating an acceptable balance between lost sales and lost revenue. The retailer can determine (at 96) whether to adjust the risk threshold value based on past payment processing. If the retailer has accepted a number of unfinanced payments that resulted in lost revenue, the retailer can raise the risk threshold value so that only checks from low-risk-score accounts are accepted. Alternatively, if the retailer has experienced a drop in sales and an increase in declined payments, the retailer can reduce the risk threshold value to accept more checks from high-risk-score accounts in an effort to increase sales. The retailer can keep the risk threshold value constant if the retailer feels that the risk threshold value is properly discriminating between high-risk-score accounts and low-risk-score accounts.

If the retailer decides to modify the risk threshold value, the retailer can set (at 90) the threshold value to a new value and can begin to process (at 92) payments using the new risk threshold value. If the retailer does not modify the risk threshold value, the retailer returns to processing (at 92) payments. In some embodiments, the retailer can adjust the risk threshold value at any time and as many times as warranted.

Other devices and applications in addition retailer or transaction provider applications and devices can access the scored negative files 16 and 66 to determine the financial stability of an account holder. For example, a credit card or credit issuing organization can use the scored negative files 16 or 66 to determine whether an account holder has been diligent in writing financed checks and can adjust a credit limit based on the risk score assigned to the account holder.

Although embodiments of the invention are described with respect to checking accounts, embodiments of the invention are not limited to specific types of financial accounts. Credit card accounts, savings accounts, and other financial accounts, for example, can utilize embodiments of the invention as described above. Checking accounts are used for illustrative purposes because negative files are traditionally used to validation check payments. It should also be understood that reference to "writing a check" or other similar phrases can include not only the physical writing of a check, but also using a debit card to make a point-of-sale purchase or to alter the financial account in any manner (such as by making an ATM withdrawal).

Various features and advantages of the invention are set forth in the following claims.

The invention claimed is:

1. A computer implemented method of validating a payment comprising:
    obtaining a first account identifier using a processor;
    accessing a database containing a plurality of account identifiers and a plurality of risk scores associated with the plurality of account identifiers, the risk scores relating to a risk that a legitimate account holder of a payment account has insufficient funds in the payment account for a payment based on a decision tree analysis including a default history of the legitimate account holder and at least one of a number of unpaid payments, a number of paid payments, a maximum number of days a payment has been unpaid, a number of days a most recent unpaid payment has remained unpaid, or a number identifier for an issued payment;
    obtaining from the database a first risk score associated with the first account identifier;
    comparing the first risk score with a risk threshold value;
    determining whether the payment is acceptable based on the comparison; and
    when the payment is acceptable, recording an acceptance of the payment using the processor.

2. The method as claimed in claim 1, wherein the determining further comprises determining that the payment is acceptable if the first risk score is less than the risk threshold value.

3. The method as claimed in claim 1 wherein the determining further comprises determining that the payment is unacceptable if the first risk score is greater than the risk threshold value.

4. The method as claimed in claim 3, further comprising recording a denial of the payment using the processor when the payment is determined to be unacceptable.

5. The method as claimed in claim 1, wherein the first account identifier is a financial account number.

6. The method as claimed in claim 1, wherein the first account identifier is a driver's license number.

7. A system comprising:
    a scored negative file configured to store a plurality of financial account identifiers, the plurality of financial account identifiers being associated with one or more risk scores, the risk scores to a risk that a legitimate account holder of a payment account has insufficient funds in the payment account for a payment based on a decision tree analysis including a default history of the legitimate account holder and at least one of a number of unpaid payments, a number of paid payments, a maximum number of days a payment has been unpaid, a number of days a most recent unpaid payment has remained unpaid, or a number identifier for an issued payment;

a processor configured to:
receive a first financial account identifier; obtain from the scored negative file at least one risk score associated with the first financial account identifier;
determine whether a payment is acceptable based on the at least one risk score; and
record the determination.

8. The system as claimed in claim 7, wherein the processor is further configured to transmit the determination to a payment processing application.

9. The system as claimed in claim 7, wherein determining whether a payment is acceptable further comprises determining that the payment is acceptable if the first financial account identifier does not correspond to financial account identifiers stored in the scored negative file.

10. The system as claimed in claim 7, wherein determining whether a payment is acceptable further comprises determining that the payment is unacceptable if the first financial account identifier corresponds to one of the plurality of financial account identifiers stored in the scored negative file.

11. The system as claimed in claim 7, wherein determining whether a payment is acceptable further comprises determining that the payment is acceptable if the at least one risk score is less than a risk threshold value.

12. The system as claimed in 7, wherein the determining whether payment is acceptable further comprises determining that the payment is unacceptable if the at least one risk score is greater than a risk threshold value.

13. The system as claimed in claim 7, wherein the processor is further configured to obtain from the scored negative file at least one risk score associated with one of the plurality of negative account identifiers corresponding to the first financial account identifier.

14. The system as claimed in claim 13, wherein the processor is further configured to transmit the at least one risk score to a first payment validation application.

15. The system as claimed in claim 13, the processor is further configured to transmit the determination to a first payment validation application.

* * * * *